Jan. 5, 1971 R. H. MULLER 3,552,778
SWIVEL COUPLINGS FOR USE IN BREATHING OR ANAESTHETIC
OR OTHER MEDICAL APPARATUS
Filed May 5, 1969
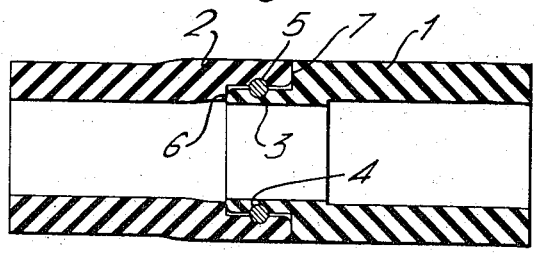
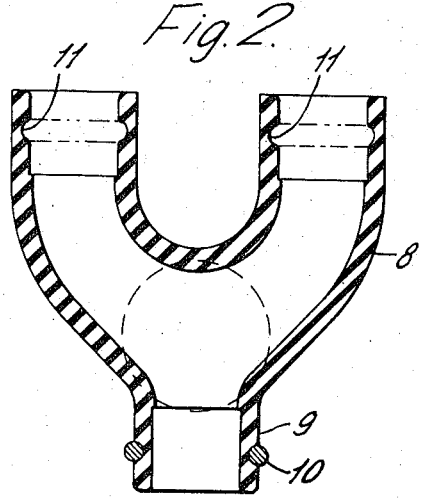
INVENTOR
ROBERT HANS MULLER
BY
Cushman Darby & Cushman
ATTORNEYS United States Patent Office 3,552,778
Patented Jan. 5, 1971

3,552,778
SWIVEL COUPLINGS FOR USE IN BREATHING OR ANAESTHETIC OR OTHER MEDICAL APPARATUS
Robert Hans Muller, London, England, assignor to J. G. Franklin & Sons, Ltd., Dalston, London, England, a corporation of England
Filed May 5, 1969, Ser. No. 821,906
Int. Cl. F16l 11/04
U.S. Cl. 285—94   5 Claims

ABSTRACT OF THE DISCLOSURE

A swivel coupling for coupling tubular parts of a breathing or other medical apparatus, comprising cooperating tubular components at least the coupling end portions of which are of a semi-rigid rubber or rubber-like material, one of said components having a male end portion and the other having a female end portion, a projecting annular rib or bead on one of said portions produced by insetting a solid or rigid ring into a peripheral surface or into a peripheral groove of said portion and the other of said portions having a cooperating groove, the components having been snapped together axially to engage the rib or bead of the one component into the groove of the other component and axially retained relatively to one another with the female portion forming a bearing rotatably supporting the male component.

---

The present invention relates to swivel couplings for use in breathing or anaesthetic or other medical apparatus.

In breathing and like attachments for anaesthetic apparatus, couplings are usually metal couplings, e.g., of chromium-plated brass or stainless steel with a friction fit of one into the other.

It is required that the components be easily separable, e.g., for sterilizing in hot or boiling water or steam for a prescribed length of time without loss of shape or other significant deterioration.

The present invention provides a swivel coupling comprising cooperating tubular components, one of said components having a male end portion and the other having a female end portion, one of said portions having a projecting annular bead produced by insetting a solid, preferably rigid, ring into a peripheral groove of the said portion and the other of said portions providing a cooperating groove, the components having been snapped together axially to engage the bead of the one component into the groove of the other component and axially retained relatively to one another with the female portion forming a bearing rotatably supporting the male component.

A suitable material with components designed as is hereinafter described is the so-called "semi-rigid rubber," i.e., material made of natural or synthetic rubber compound with a reinforcing plastics material, e.g., high styrene co-polymer, preferably to obtain a 95–98 International Rubber Hardness Degree (I.R.H.D.). Such a material will adequately withstand impact and avoid consequent damage and is resistant to corrosion by anaesthetic gases and vapours and is such that the components may be serilized by immersion in hot or boiling water or by steam without eventual loss of shape or other significant deterioration.

The coupling components may be made electrically conductive as by the inclusion of carbon black in well known manner to counter damaging effects of static electricity liable to be gentrated in this type of apparatus.

The said ring may be made of metal or alternatively of other suitable solid, preferably rigid, material, e.g., of a thermo-setting plastics, and is preferably provided on the male component.

Two such engaged non-metallic components may be effectively lubricated by a lubricant selected so as not to swell the material thereof, e.g., a silicon oil, graphite, or molybdenum sulphide and especially a suspension of graphite and/or molybdenum sulphide in silicon oil.

With the aid of such lubricants, dry lubricated surfaces can be produced such that the mating ends can be readily interengaged to make the coupling without material displacement of the lubricant such as would prevent the cooperating surfaces from remaining well lubricated after assembly. Moreover if the components be proportioned as stated, no special sealing provision need be made although the ring could be made to contact the groove without materially interfering with the desired freedom of rotation.

With one component or its coupling end suitably softened or made rubble-like, e.g., by heat as by dipping it into a hot medium, the solid, preferably rigid, ring can be forced into an external or internal groove in the component so that when the material recovers and sets the ring will be firmly anchored and will form a bead on the periphery of the component.

The female component or its coupling end may be produced with a rounded or flared outer end, so that the two components or their coupling ends may be snapped into engagement with one another and thus axially retained, yet relatively rotatable with little or no looseness or radial play. The end of the male component may be externally rounded or chamfered to promote lead-into the female component.

In order that the invention may be the more clearly understood reference is hereinafter made to the accompanying drawings in which one embodiment of the invention is illustrated by way of example in FIG. 1 and another embodiment in FIG. 2.

Referring to FIG. 1, the male component 1 and the female component 2 are formed of semi-rigid rubber as aforesaid. The male component 1 is provided with a spigot end 3 having external annular rounded rib or bead formed by insetting a metallic or other hard ring 4 into a preformed groove in the male component while heated around the ring.

The female component 2 is moulded to shape and to include an internal peripheral groove 5.

The components are such in the finished form and have such resilience, as to allow the coupling to be made by pressing the two components together in the axial direction so that the bead or rib formed by the projection of the ring from the periphery of the male component will snap into the groove in the female component. The female component may have a shoulder 6 up to which the end of the male component may be positioned and the male component may have a shoulder 7 up to which the female end may be positioned.

The parts are preferably so proportioned that when the coupling is made there will be little or no radial play between the components save for permitting a film of lubricant, e.g., as aforesaid, to be applied to the cooperating surfaces. This may be applied before assembly to facilitate assembly although it may be applied after assembly through a suitable hole in the wall of one of the components, and will after assembly permit smooth relative rotation between the two components.

With or without disassembling the components they may be sterilized in hot or boiling water or steam without suffering any such deformation as would interfere with subsequent relative rotation.

The coupling components may be formed by moulding straight coaxial elements or by elements forming an elbow, T cross or other suitable junction, in which case one component of each coupling e.g., the male component, may be common to a number of cooperating components, e.g., female components. Alternatively said components may have two or more female ends or both female and male ends. Two aligned couplings may form a hinge where this is desired. One straight or angled component may have a male end and a female end.

FIG. 2 shows a moulded connector such as is generally used for coupling a face mask on the one hand to corrugated tubes on the other provided with a suitable air control, but made according to the present invention. Accordingly the connector 8 is made of a semi-rigid rubber. The base of the Y or V shaped connector will generally be formed to provide a male coupling end 9, and therefore is provided with an inset metal or other suitable hard ring 10 let into the material or into a preformed groove therein as aforesaid. The two branches may likewise be formed in the same manner as male ends, but they may be, as shown, formed as female ends, i.e., with internal annular grooves 11, and preferably of somewhat less cross-sectional thickness than the male end. The face mask may be moulded of a semi rigid rubber with a female coupling end to cooperate with the male end 9 and the usual corrugated tubes may be formed of the same material and with male or female coupling ends or with suitable adaptors with such ends as counterparts to the coupling ends of the branches.

The ends of the male and female components may respectively be rounded or chamfered and flared and rounded to facilitate lead of one into the other.

With an external diameter of the components of approximately 1¼", in the thick sections of the coupling components is advantageous, the coupling end of the male element advantageously being somewhat more than ⅛" thick, and the coupling end of the female component somewhat less than ⅛" thick, the rib or beed about 1/16" in cross-sectional height, and being generally rounded.

However the wall of the male component may in some cases be of less thickness than that of the female component or the wall thicknesses may be equal.

It is generally desirable to make the length of the male component rotatable in or rotatably supporting the female component equal to at least one-half of the external diameter of the corresponding portion of the male component, so that a good running or sliding fit between the respective components can be ensured, and the components may be moulded to produce smooth cooperating surfaces.

The cooperating rib or bead and groove may be of other than semi-circular or rounded form, e.g., of triangular or truncated triangular or other suitable form, and they may be formed so that after the joint is made the components cannot be separated by relative axial movement, e.g., they may be provided with cooperating radial faces for this purpose. Where triangular or like shapes are provided the edge or edges may be suitably rounded.

What I claim is:

1. A swivel coupling for coupling tubular parts of a breathing or other medical apparatus, comprising a pair of cooperating tubular components, the first of said components having a semi-rigid rubber male end portion and the second of said components having a semi-rigid rubber female end portion, the female component having an internal shoulder up to which the male end portion can be positioned and the male component having an external shoulder up to which the female end portion can be positioned, a projecting annular bead on one of said portions produced by insetting a solid ring into a peripheral groove of the said portion and the other of said portions having a cooperating groove, the components having been snapped together axially to engage the bead of the one component into the groove of the other component and axially retained relatively to one another with the male end portion positioned up to the internal shoulder of the female end portion and the female end portion positioned up to the external shoulder of the male end portion, the female portion forming a bearing rotatably supporting the male component.

2. A swivel coupling according to claim 1, lubricated where the components are rotatably supported one on the other by a lubricant selected so as not to swell or attack the semi-rigid rubber material.

3. A swivel coupling according to claim 2 having the lubricant selected from the group consisting of a suspension of graphite in silicon oil and a suspension of molybdenum sulphide in silicon oil.

4. A swivel coupling according to claim 1, in which the end of the bore of the female component is rounded and the end of the male component is externally rounded to promote lead of one component into the other.

5. A swivel coupling according to claim 1, comprising a plurality of pairs of cooperating tubular components and a connector for connecting said cooperating components to a face mask one tubular component of each of said pairs being provided by the connector.

References Cited

UNITED STATES PATENTS

| | | | |
|---|---|---|---|
| 2,310,490 | 2/1943 | Melsom | 285—276 |
| 2,466,642 | 4/1949 | Larsen | 252—25 |
| 2,642,911 | 6/1953 | Shazor | 285—S.F. |
| 2,889,089 | 6/1959 | Herrick et al. | 285—260X |
| 3,013,820 | 12/1961 | Pouppirt | 285—423X |
| 3,208,757 | 9/1965 | Jageman | 285—260X |

FOREIGN PATENTS

| | | | |
|---|---|---|---|
| 839,680 | 6/1960 | Great Britain | 285—276 |

DAVE W. AROLA, Primary Examiner

U.S. Cl. X.R.

285—151, 260, 276